United States Patent [19]

Cooper et al.

[11] Patent Number: 4,866,543
[45] Date of Patent: Sep. 12, 1989

[54] MULTIPLE SLAVE VIDEO TAPE REPRODUCTION SYSTEM

[75] Inventors: J. Carl Cooper; John P. Yu, both of Sunnyvale, Calif.

[73] Assignee: Electro Sound, Inc., Sunnyvale, Calif.

[21] Appl. No.: 95,491

[22] Filed: Sep. 11, 1987

[51] Int. Cl.⁴ .......................... G11B 5/86; H04N 5/78
[52] U.S. Cl. ........................................ 360/15; 360/35.1
[58] Field of Search .......................... 360/15, 14.1, 35.1

[56] References Cited

U.S. PATENT DOCUMENTS 4,577,239 3/1986 Sougen .................................. 360/15
4,758,902 7/1988 Okamoro et al. ..................... 360/15

Primary Examiner—Vincent P. Canney
Attorney, Agent, or Firm—Rosenblum, Parish & Bacigalupi

[57] ABSTRACT

A multiple slave video tape reproduction system comprising: a master, including an optical disc player having two read heads located on opposite sides of the master disc for scanning the individual tracks of the disc and developing electrical signals representing the data stored, a timing means for coordinating the output sequence of the developed signals, and a processing means for configuring the developed signals so that they may be recorded onto a video tape; and a plurality of slave recorders, including a head drum, having four write heads located at 90 degree angles to each other around the circumference of the head drum whereby oppositely located heads form an electrically connected head pair, and mechanical and electrical components for moving and controlling the guide drum and tape.

53 Claims, 9 Drawing Sheets

| | | | | | | | | |
|---|---|---|---|---|---|---|---|---|
| READ HEAD #1 | F1fI | F1fII | F3fI | F3fII | F5fI | F5fII | F7fI | F7fII |
| READ HEAD #2 | | F2fI | F2fII | F4fI | F4fII | F6fI | F6fII | F8fI |
| SUPPLY CHANNEL A | F1fI | F2fI | F3fI | F4fI | F5fI | F6fI | F7fI | F8fI |
| SUPPLY CHANNEL B | | F1fII | F2fII | F3fII | F4fII | F5fII | F6fII | F7fII |
| HEAD PAIR A | | F1fI | F2fI | F3fI | F4fI | F5fI | F6fI | F7fI | F8fI |
| HEAD PAIR B | | F1fII | F2fII | F3fII | F4fII | F5fII | F6fII | F7fII |

TAPE TRAVEL DIRECTION

MULTIPLE SLAVE VIDEO TAPE REPRODUCTION SYSTEM

BACKGROUND OF THE INVENTION

1. Field of the Invention

The following invention relates generally to video tape reproduction systems, and more particularly to a high speed tape reproduction system in which a plurality of reduced component slave recorders are used in combination with a specially modified high speed reproduction master recorder.

This application is related to copending application Ser. No. 07/095,978 filed Sept. 11, 1987, entitled "System and Method For High Speed Video Tape Reproduction", assigned to the assignee of the present invention.

2. Brief Description of the Prior Art

Prior art video reproduction systems are typically comprised of a master, such as a high quality video tape recorder (player), connected to a multiple number of slave recorders, such as off-the-shelf consumer VHS or BETA video tape recorders, which may be purchased in bulk quantities at great savings. As the master reads the audio and video signals, comprising the recorded program, at the standard playback speed, one or a number of slaves record the information onto blank video tape at the same recording speed. To increase reproduction productivity, as many as 100 slave recorders will be connected to each master recorder. Naturally, the greater the number of slaves combined with each master, the greater the number of tapes produced during each production period.

Combining a large number of slave recorders to each master system can be rather expensive. Apart from the costs associated with purchasing and maintaining as many as 100 slave recorders, the quantity of recorders alone require that adequately sized facilities be available to house the recorders, as well as air conditioning to keep the recorders operable. In addition, each new recording requires the previously recorded tape to be removed and the next blank tape to be installed in each slave recorder. Thus, unless a large number of operators or automated loaders are available, unloading and loading as many as 100 recorders can add a significant amount of time to the overall recording period. In addition, when a large number of operators are utilized, many will have nothing to do while the recording is being made, further adding to the cost of each recording unnecessarily. Thus, prior art recording systems may only be able to record as few as 300 two-hour programs in an eight hour production cycle.

The audio recording industry has long recognized that recording at any rate faster than the standard playback rate will enhance productivity and lower production costs. However, while audio duplicating systems are known to record as fast as 64 times the playback speed, it is much more complicated to increase the speed of video recording. In audio recording, a stationary head records the information onto the tape as the tape is pulled across the surface of the head, at a speed proportional to the signal input rate to the head. If the tape passes across the surface of the head at five times normal speed, the frequency of the input signal must be five times the normal signal frequency. Higher recording signal frequencies are generally achieved by passing the tape across the master playback head at five times normal speed.

In video tape recording, much more is required to increase the recording speed than raising the output signal frequency and proportionally increasing the speed at which the tape passes the head. VHS and BETA tape recorders typically utilize two recording heads mounted 180 degrees out of phase to each other on the circumference of a rotary head drum. The magnetic recording tape is wrapped around a portion of the drum and kept in contact with the circular surface of the drum. When recording, the drum rotates in one direction with respect to the tape so that the two heads move in a wave like motion and produce a series of helical scan recordings on the tape. To increase the recording speed of a prior art recorder, both the longitudinal speed of the tape and rotational speed of the head drum must be increased accordingly.

At 1800 revolution per minute (RPM), the rotational and horizontal movement of the head drum is controllable, however, at double the recording speed, where the head drum rotates at 3600 RPM, and at quadruple the recording speed, where the head drum rotates at 7200 RPM, the rotational movement of the head drum becomes unstable. For each increase in recording speed, there is a square or cube multiplication of technical problems associated with the speed increase. Likewise, for each increase in the rotational speed of the drum, there must be a proportional increase in the video signal frequency. If the playback signal frequency is at 5 MHz, the recording signal frequency of a recording made at four times (4X) speed must be 20 MHz.

Electronics circuits capable of handling high frequency signals are both difficult and expensive to design and build. Where a standard playback speed recording system can be purchased for as little as $500.00, a two times (2X) speed recording system, in order to be cost effective, can cost no more than $1000.00, and a 4X speed recording system can cost no more than $2000.00. A major expense in increasing the overall system recording speed involves the modification of each slave recorder to accommodate high speed recording. Even though the master recorder would require extensive modification, such modification can be carried out fairly inexpensively because only the one master need be modified. However, if the master recorder is modified, each of the 100 or more slaves attached to the master recorder would also require modification. Hence, the costs that could be saved by purchasing a large quantity of consumer VTRs would be forfeited when each VTR was required to be modified.

Although it is possible to operate a standard VTR at 2X speed by increasing the rotational speed of the slave head drum, doing so is not desirable because the standard VTR is not designed to operate at high speeds for extended periods of time. Thus, mechanical constraints on standard VTR's and the probability of reduced equipment life expectancy make converting a standard speed system over to a high speed system impractical.

The use of as many as four heads in the head drum of recorders is well known in the prior art, at least with regard to applications in which the recording speed is the same as the playback speed. Tsuruta, U.S. Pat. No. 4,014,985, issued Sept. 30, 1986, discloses a signal switching system for selectively supplying each of the four recording heads of the head drum with appropriate video signals. Although Tsuruta discloses that a four-head rotary head drum can be used in place of a two-head drum, Tsuruta also discloses that a number of mechanical and electrical conditions must be met for the four-head drum to record a video signal compatible with standard two-head drum recorders. One condition is that the tape must be wrapped around the peripheral surface of the head drum at an angular range of approximately 270 degrees. A second condition is that the tape speed must be selected so that the tape travels by one track pitch during one field period in which one rotary video head rotates by 270 degrees.

In order to meet the above conditions, Tsuruta disclosed that the diameter of the head drum must be reduced to ⅔ the diameter of a standard two-head drum and that an elaborate head signal switching system must be employed, rather than the standard practice of applying continuous recording current to the two recording heads. Thus, recording current is supplied to one head as it makes a 270 degree rotational pass, while the two immediately following heads are supplied no recording current, then recording current is supplied to the third immediatly following head, etc. A signal switching system that provides accurate phase control synchronization for a reduced diameter four-head drum similar to that disclosed in Tsuruta is disclosed in U.S. Pat. No. 4,609,952, issued Sept. 2, 1986, to Yoshino et al.

Other increased speed recording systems, utilizing a variety of recording techniques, have been developed over the years to overcome the problems associated with increasing tape and head drum speeds. One such system is disclosed by U.S. Pat. No. 4,320,486, issued Mar. 16, 1982, to Cooley et al., in which an optical storage medium is used as an intermediate transfer medium from which recorded information signals may be reproduced at speeds of 2 to 200 times normal playback speed. However, as with all such system before, such high speed recording systems have greater application to audio recording, where the heads are stationary, then to video recording, where heads must be rotated faster to accommodate the increased signal frequency supplied to the slave recorder. SUMMARY OF THE INVENTION It is therefore an object of the present invention to provide a system for producing a high quantity of compatible video recordings at a speed which is some multiple of the playback speed of each recording.

Another object of the present invention is to provide a reduced component slave recorder capable of operating at a greater than standard playback speed.

Still another object of the present invention is to provide a high speed video reproduction system which can use either a plurality of reduced component VTR slave recorders or reduced component pancake recorders.

A further object of the present invention to provide a high-speed master recorder that is capable of reproducing a video recording and developing a corresponding output signal which may be directly applied to the write heads of a plurality of slave recorders.

A still further object of the present invention is to provide a high speed slave recorder that is not simply operated faster than its standard operating speed in order to decrease the standard recording time.

A still further object of the present invention is to provide a magnetic tape recording system in which multiple read heads supply recording signals to multiple write head pairs.

Briefly, a preferred embodiment of the present invention utilizes a master recorder, including an optical disc player having two read heads located on opposite sides of the master recording disc for scanning the individual tracks of the disc and developing electrical signals representing the data stored. Also included within the master recorder is a timing means for coordinating the output sequence of the developed signals from the master recorder, and a processing means for configuring the developed signals so that they may be recorded onto a video tape by each of the slave recorders. The master recorder is connected to a plurality of slave recorders, including a head drum, having four write heads located at 90 degree angles to each other around the circumference of the head drum whereby oppositely located heads form a electrically connected head pair, and mechanical and electrical components for moving and controlling the head drum and tape.

These and other objects and advantages of the present invention will become apparent to those skilled in the art after having read the following detailed description of the preferred embodiment illustrated in the several figures of the drawing.

BRIEF DESCRIPTION FO THE DRAWING

DESCRIPTION OF THE PREFERRED EMBODIMENT

Figure 1:
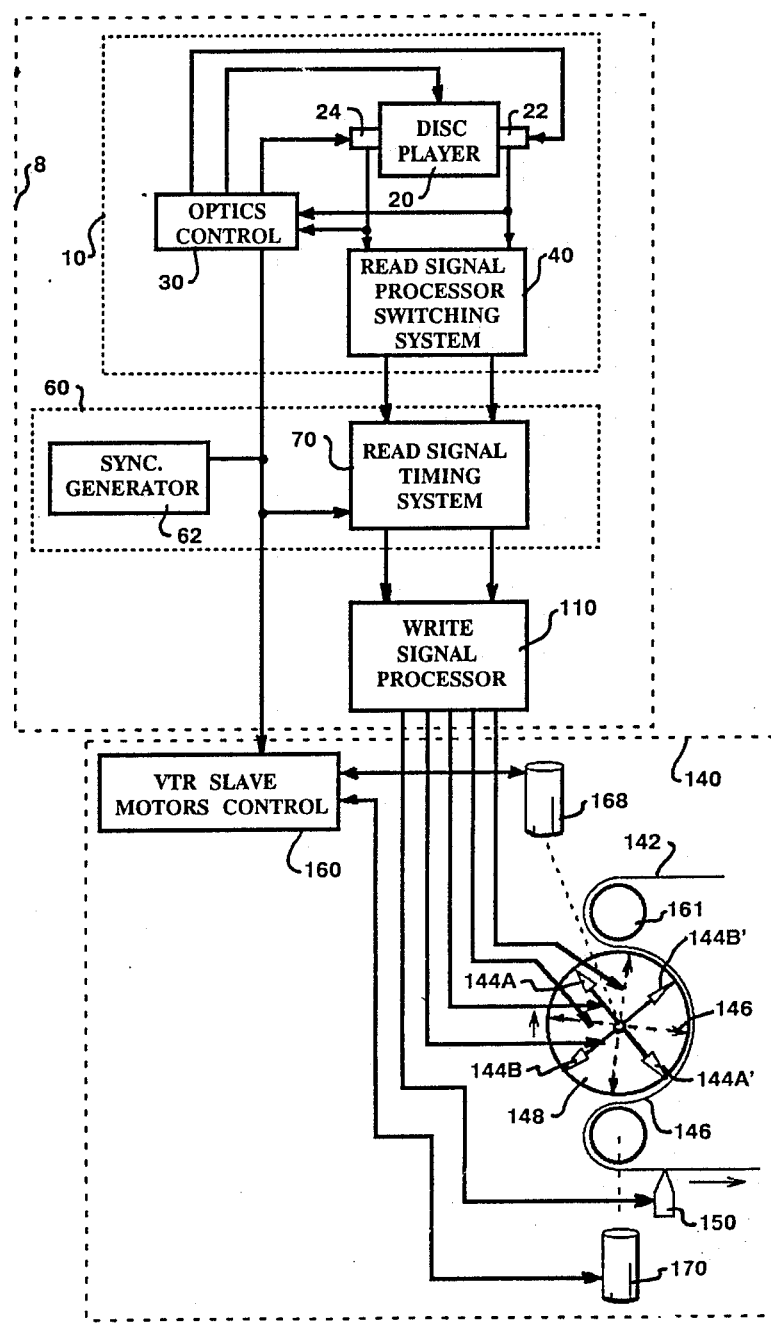
FIG. 1 is a diagram schematically illustrating the principal function components of the master and slave recorder apparatus of a preferred embodiment of the present invention.

In reference to FIG. 1 of the drawing, a diagram is shown schematically illustrating the principal functional components of the master 8 and a single slave recorder 140 of a preferred embodiment of the present invention. The master 8 is comprised of three essential elements, the read system 10, the timing system 60, and the write signal processor 110.

The read system 10 is comprised of an optical disc player 20 with two laser read heads 22 and 24. The reading sequence and mechanical positioning of the read heads 22 and 24 is maintained by optics control 30. As audio and video signals are read by the read heads 22 and 24, the signals are communicated to read signal processor/switching system 40, where the signals are electronically enhanced, and separated by a switching system into various signal components.

Timing system 60 is comprised of the synchronizing generator 62, which supplies a common timing signal throughout the system and read signal timing system 70, which controls the communication of audio and video signals to the write signal processor 110. Write signal processor 110 is made up of a number of signal manipulation circuits which prepare audio and video signals communicated from read signal timing system 70 so that the signals may be output to the write heads of slave recorder 140.

Fully processed audio and video signals input to the slave recorder 140 are recorded onto magnetic tape 142 by video write heads 144, which are configured so that video write heads 144A and 144A' form a first electrical head pair A and video write heads 144B and 144B' form a second electrical head pair B. The four audio write heads 146 also have oppositely located heads on the circumference of the head drum electronically connected as head pairs. Each audio or video head pair is connected to either a respective audio or video output from write signal processor 110, so that both write heads of each head pair receive the same input signal at any given time.

Video write heads 144 are located around the circumference of rotary head drum 148 at 90 degree angles to each other. Audio write heads 146 are also located around the circumference of rotary head drum 148 at 90 degree angles to each other, as well as 45 degree angles with respect to each video write head 144. A stationary audio write head 150 is supplied with biased audio signals from write signal processor 110 for recordation on magnetic tape 142.

VTR (Video Tape Recorder) slave motors control 160 is synchronized with the timing signal of synchronous generator 62 to control the motorized drive of the mechanical components of the slave recorder 140, such as the head drum 148 and the capstans 161. Head drum motor 168 and capstan motor 170 are supplied with control signals by slave motors control 160 in order to synchronize the passage of the magnetic tape 142 and the rotation of the head drum 148 with the sequential supply and electrical frequency of the audio and video signals. As viewed from the top, head drum 148 rotates in a counter clockwise rotation while tape 142 runs past the rotating heads in the same direction.

In operation, an optical disc, recorded with either constant linear velocity (CLV) or constant angular velocity (CAV) type recording techniques, of a video program is put on disc player 20. Upon being activated, disc player 20 sets first read head 22 to start at the first occurring track of desired information, i.e., track 1, and sets second read head 24 to start at the next occurring track, i.e., track 2. Read heads 22 and 24 are located opposite each other, such that upon starting the operation of disc player 20, read head 22 would see optically recorded information before the same information could be detected by read head 24. When information is recorded on the optical recording disc, vertical sync pulses, or field sync markers, and frame number codes are recorded in the same relative position for each track, which is characteristic of CAV recordings. Thus, one half of a rotation must pass, after read head 22 receives a vertical sync pulse for the track over which its is mechanically positioned, before read head 24 receives the vertical sync pulse for the track over which it is mechanically positioned.

Once initialized in the manner described above, read head 22 would finish reading track 1 and move to track 3 and begin reading track 3, while read head 24 finished reading track 2. In other words, except during the first half rotation and last half rotation of the disc during the playback of a program, the two read heads 22 and 24 simultaneously read audio and video signals from odd and even occurring optical disc tracks, respectively. By rotating the optical disc at twice its normal rotation speed and thereby reading data from the disc at twice the standard playback rate, the two electrical signals produced by disc player 20 effectively reproduce the master program at four times its standard playback rate.

Each optical disc track contains one whole frame (F) of video information. Each frame is comprised of a first and second field (fI,fII), in accordance with NTSC format recording techniques. Video and audio signals representing each field of each frame are separated and processed by read signal processor and switching system 40, so that frame 1, field I (FifI) and all subsequently occurring first fields can be delayed in time without also delaying frame 1, field II (F1fII). Field separation is also necessary to record each field as a separately recorded path on the surface of the magnetic tape 142.

Figures 2, 3:
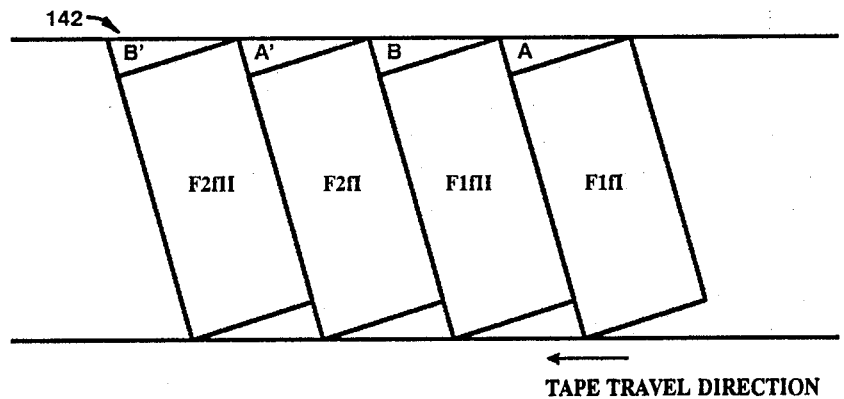
FIG. 2 is a timing diagram indicating the read, supply and write sequence of each TV field from the master recorder to the slave recorder.
FIG. 3 is a diagram showing a track pattern on a magnetic tape recorded in accordance with a preferred embodiment of the present invention.

The timing diagram of FIG. 2 illustrates the sequence at which each field of each frame of video information is read and processed by master 8 and recorded on the magnetic tape 142 by heads 144. First read head 22 (Read Head #1) reads track 1, comprising F1fI and F1fII, and then skips to track 3, where it reads F3fI and F3fII, etc. Likewise, second read head 24 (Read Head #2) starts reading track 2 (F2fI) after the disc has made ½ of a rotation, then finishes track 2 (F2fII) and skips to track 4, where it reads F4fI and F4fII, etc. The signals are then switched as read into read signal processor/switching system 40 so that a first stream of field I video signals are supplied along one electrical path, which eventually leads to write heads 144A and 144A', and a second stream of field II video signals are supplied along a second electrical path, which eventually leads to write heads 144B and 144B'. The first stream of video signals is indicated in FIG. 2 by the timing line "Supply Channel A", and the second stream of video signals is indicated by the timing line "Supply Channel B".

Read heads 22 and 24 are separated by 180 degrees solely for the sake of convenience in operating the read heads without interference from one another. Thus, read heads 22 and 24 may be separated by 90 degrees, which removes the requirement for phase delay. Similarly, the phase separation between read heads can be any angle desired, provided that any difference in phase separation between the signals as read from the optical disc is compensated for by the timing system so that the proper angular separation is obtained when the same signals are applied to the write heads of the head drum 148.

It should be noted that because the phase separation between the read heads 22 and 24 is 180 degrees, and the phase separation between the write heads 144 is only 90 degrees, it is necessary to delay the first stream of signals to the first write head pair by the amount of time necessary to shift the signal field sync frequency of the first stream 90 degrees late. Although the phase delay may be accomplished by a number of means, such as delaying an analog signal with a charge-coupled device, converting the analog signals to digital provides an opportunity to enhance the signals quality, as will be described in detail below. As noted in FIG. 2, the switched and processed signal are then supplied to head pairs A and B for recordation on the tape as shown in FIG. 3, depicting a track pattern as recorded on the magnetic tape 142.

Write head 144A, as shown in FIG. 1, is about to rotate into contact with moving magnetic tape 142. If the stream of video signals indicated by the line Head Pair A of FIG. 2 is timed so that F1fI is applied to head pair A at the same time write head 144A comes into contact with tape 142, the track pattern A of FIG. 3, which comprises F1fI, will be recorded on tape 142. As write head 144B comes into contact with tape 142, the track pattern B of FIG. 3, which comprises F1fII, will be recorded. Likewise write heat 144A' will record track pattern A' of FIG. 3 and write head 144B' will record track pattern B' of FIG. 3, as each comes into contact with the tape, respectively.

As will be appreciated, the stream of signals applied to any of the write heads during the recordation of a video program forms a continuous stream that is not required to be separated into individuals fields prior to application to the write heads. Thus, unlike prior art systems, the signal switching system utilized in the preferred embodiment of the present invention is much less complicated, and the type wrap angle is no longer required to be greater than 270 degrees. As shown in FIG. 1, the tape wrap angle is just over 180 degrees. A tape wrap angle between 180–190 degrees can provide a certain amount of overlap noise correction, while, in all practicality, only allowing one head of any head pair to be recording at any particular time.

Figure 8:
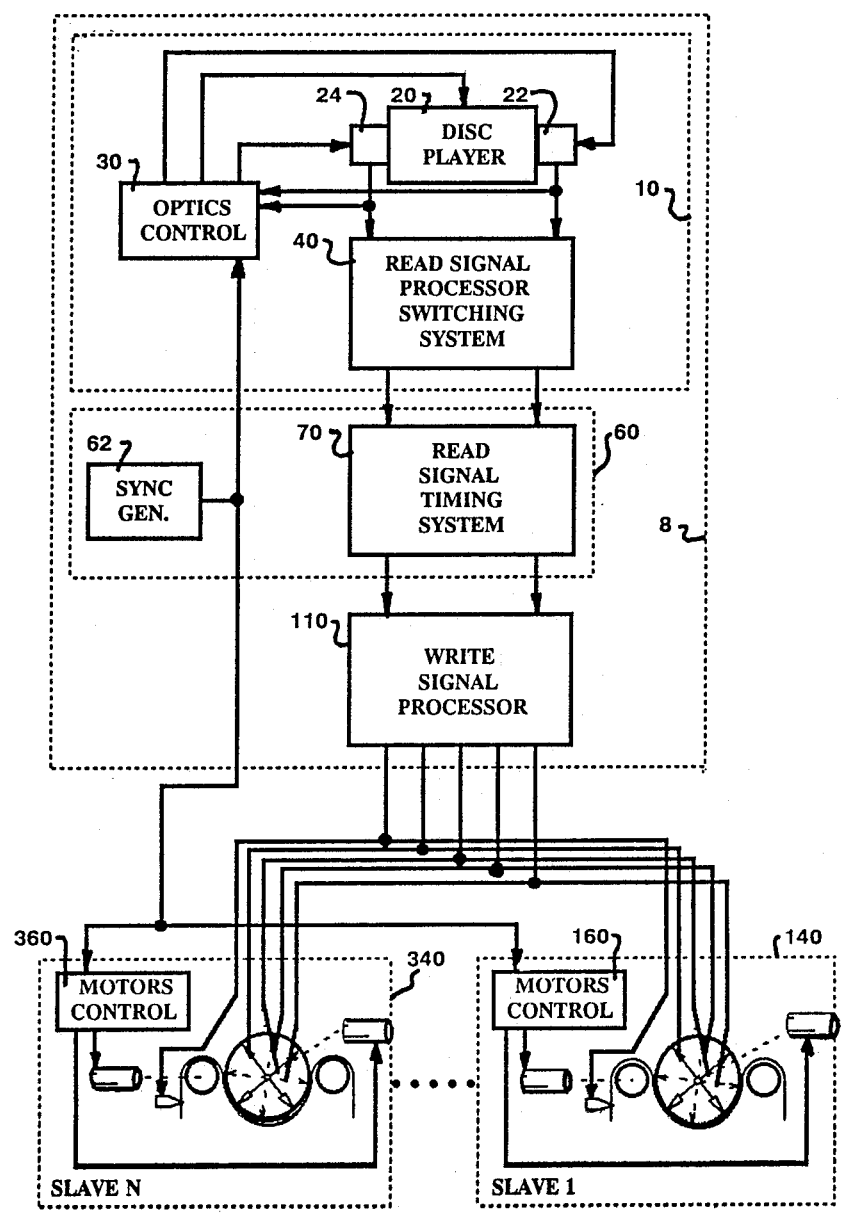
FIG. 8 is a diagram schematically illustrating a master and multiple quantity of cassette slave recorders operating as a recording system.

As will also be appreciated, the head wrap angle of the preferred embodiment of the present invention is no longer proportional to the increased number of heads on the head drum. As long as each head of each head pair are 180 degrees apart, the tape wrap angle may still be approximately 180 degrees. Thus, the tape wrap angle need not be increased, as is the case with prior art recorders, each time additional heads are added to the head drum. Some of the advantages of a smaller tape wrap angle are as follows: (1) less surface contact by the tape with the guide drum promotes less wear; (2) smaller wrap angles require less tape to be pulled from the tape cassette during recording; and (3) tape can be run past the head drum at faster speeds with fewer mechanical complications. Further, it will be appreciated that even smaller tape wrap angles can be utilized by increasing the number of head pairs. For example, if a third video head pair was added to the head drum as is depicted in FIG. 8, a tape wrap angle as small as 120 degrees could be utilized, provided that no slant azimuth was used on the heads.

Figure 4:
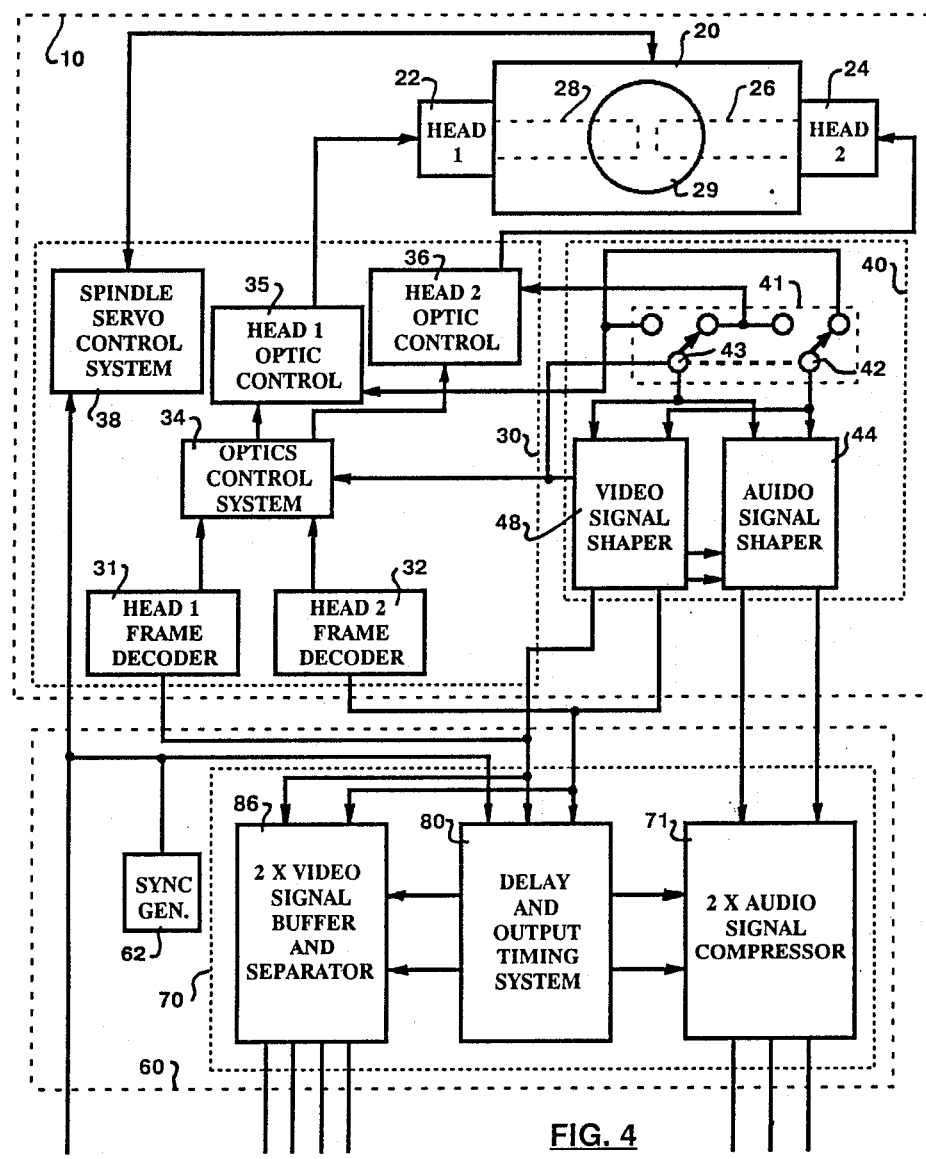
FIG. 4 is a diagram further schematically illustrating the read system and read signal timing system of the master of a preferred embodiment of the present invention.

Further schematic illustration of the read system 10 and read signal timing system 70 is depicted in FIG. 4. Read head 22 is shown to follow the path 26 and read head 24 is shown to follow the path 28 while reading odd or evn tracks of the optical disc 29. The mechanical positioning of read heads 22 and 24 is maintained by optics control 30. Processed video signals, representing the first and second stream of video signals, output from read signal processor/switching system 40 are input to head 1 frame decoder 31 and head 2 frame decoder 32. Decoders 31 and 32 determine which signal corresponds to what mechanical position of the read heads in relation to the disc 29, and then output the results to optics control system 34. Decoders 31 and 32 could also include video demolulators which would be directly responsive to read heads 22 and 24, rather than share demodulation with video signal shaper 48.

Optics control system 34, which also receives switches 42 and 43 position information from video signal shaper 48, issues alignment and positioning commands to head 1 optics control 35 and head 2 optics control 36, which in turn supply positioning information to the read heads 22 and 24. Spindle motor servo control of the rotation of the optical disc is maintained by spindle servo control system 38, independently synchronized by sync generator 62.

Audio and video signals detected by read heads 22 and 24 are input to the double-pole-double-throw electrical switch 41, which may also be an electro-mechanical device. At the point in time during which read head 22 inputs F1fII to switch 41 and read head 24 inputs F2fI to switch 41, the contact points of switch 41 will be configured so that the audio and video signal components of F1fII are directed toward the previously mentioned second electrical path and the audio and video signal components of F2fI are directed toward the previously mentioned first electrical path. At the point in time during which read head 22 inputs F3fI to switch 41 and read head 24 inputs F2fII to switch 41, the contact points of switch 41 will be switched so as to cause the signals representing F3fI to follow the electrical path followed by the signals representing F2fI, etc. Because each field is comprised of video and audio components that must be processed separately, each electical path is divided into an audio and video path which is processed by audio signal shaper 44 and video signal shaper 48, respectively.

Audio signals output from audio signal shaper 44 are supplied to 2X audio signal compressor 71, which operates as both a frequency delay and compressor for the audio signals. Delay and output timing system 80 supplies timing information to compressor 71 to control the amount of time by which audio signals are delayed, and to control the compression of those signals (if required). The compressor function is actually just the recombination of the two audio input signals, each operating at two times speed, so that a single audio signal operating at four times speed is produced. Video signals output from video signal shaper 48 are supplied to both the delay and output timing system 80 and the 2X video signal buffer and separator 86, the latter of which is comprised of frame buffers (a digital storage device, such as dynamic random access memory) for temporary storage of the video signals and a chromanance (chroma) and luminance (luma) video signal separator. The audio signal compressor 71 is responsive to video signal timing information supplied by the delay and output timing system 80, because audio signals contain no timing information. However, since the audio signals are recovered as part of the video signals, and are therefore timed accordingly, video timing information may be used to control the audio signals.

Figure 5:
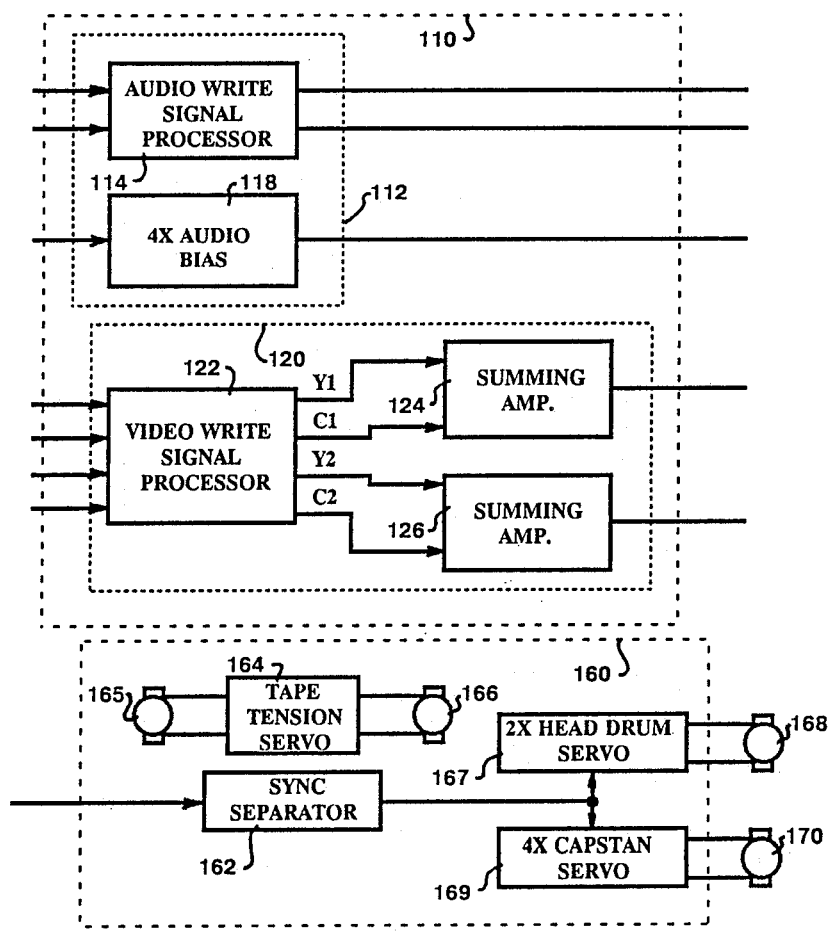
FIG. 5 is a block diagram illustrating the write signal processor of the master and VTR slave motors control of the slave recorder of a preferred embodiment of the present invention.

The block diagram of FIG. 5 illustrates the write signal processor 110 and VTR slave motors control 160.

Audio signals output from audio signal compressor 71 are input to audio write processor 112. Audio write signal processor 114 prepares the audio signals for recording on the tape 142 by audio write heads 146. 4X audio bias 118 adds a bias signal to the inputted compressed audio signal that is to be recorded on tape 142 by stationary audio head 150. Video signals output from video signal buffer and separator 86 are input to video write system 120, where the signals are electronically enhanced and separated into chroma and luma signals, which are in turn, respectively converted and modulated by video write signal processor 122. The separated and modulated chroma and luma signals for each of the two video signals are then recombined by summing amplifiers 124 and 126.

It is to be noted that rotary audio heads 146 are primarily used for hi-fi stereo recording, while stationary audio head 150 is required for mono recording. Hence, if one particular type of audio recording is desired, it is unnecessary to provide for both types of heads. In addition, it is also possible to record audio hi-fi signals with video write heads 144, in other than helical recording applications, if the audio signals are subcarriers merged in the video spectrum. This later technique is perhaps best suited for linear video recording applications.

The VTR motors control 160 is comprised of sync separator 162, which receives an input sync pulse from sync generator 62 and outputs separated timing signals to: 2X head drum servo 167, controlling the operation of head drum motor 168; and to 4X capstan servo 169, controlling capstan motor 170. Although tape tension servo 164 and motors 165 and 166 are shown within control 160, tape tension may be controlled independent of a sync pulse. Thus, tape tension servo 164 and motors 165 and 166 could also be located outside of control 160. Note that the combination of FIG. 4 and FIG. 5 is representative of the entire recording system, which is more simply depicted in FIG. 1.

Figure 6:
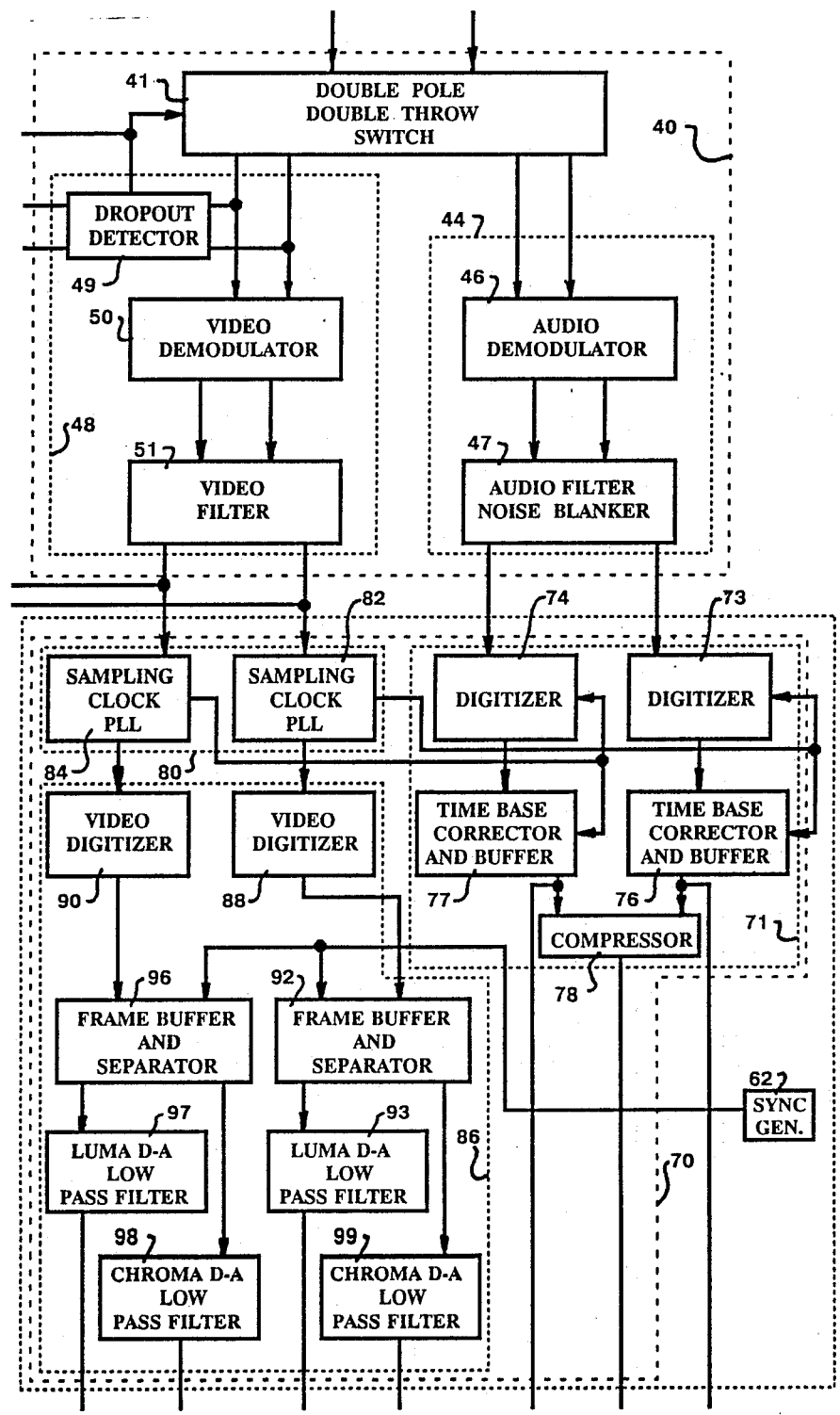
FIG. 6 is a block diagram further illustrating the read signal processor/switching system and the read signal timing system of the master of a preferred embodiment of the present invention.

Further illustration of read signal processor/switching system 40 and write signal processor 70 are depicted in FIG. 6. Disc player 20 and optics control 30 of FIG. 4 may be combined with read signal processor/switching system 40 and read signal timing system 70 of FIG. 6 along with all of FIG. 5, to illustrate a more detailed version of the recording system. Audio signals output from switch 41 are input to audio signal shaper 44, which is comprised of an audio demodulator 46 and audio filter/noise blanker 47, that enhances the characteristics of the analog audio signals. Likewise, video signals output from switch 41 are input to video signal shaper 48. A dropout detector 49 may be used to measure the amount of dropout in the analog video signals and to output correction signals for use with dropout compensation circuitry. In addition, by incorporation of a simple video demodulator, the dropout detector 49 can be used to supply frame location information to switch 41 and optics control system 34. Video signal shaper 48 also includes video demodulator 50 and video filter 51 for enhancing the characteristics of the analog video signals.

The output analog audio signals of audio filter/noise blanker 47 are converted to digital signals by digitizers 73 and 74 and input to time base corrector and buffers 76 and 77, which operate to receive and delay one or more audio channels in order to provide properly timed audio signals to the audio write heads 146. Once again, compressor 78 can be used to take the stored audio signals at two-times playback speed, and output a reassembled audio signal operating at four-times playback speed.

The output analog video signals of video filter 51 are input to sampling clock PLL's 82 and 84, of delay and output timing system 80, in order to synchronize signal timing for processing and data storage. Video signals are then output to video digitizers 88 and 90, of 2X video signal buffer and separator 86, which convert the analog signals to digital. Frame buffer and separator 92 may then be utilized to provide a temporary storage of the digitized video signal. Frame buffer and separator 92 is also responsive to timing signals from sampling clock PLL 82, so that a properly timed video signal, matching the corresponding delayed and timed signal output from time base corrector and buffer 76, may be output. In addition, frame buffer and separator 92 separates the video signal, composed of chromoa and luma components, so that the output signal may be modulated in accordance with the particular slave recording standard used.

If separate chroma and luma signals are not required, a single composite video signal may be output to a low pass filter and digital-to-analog converter. In FIG. 6, the video signal is separated so that both a luma digital-to-analog/log pass filter 93 and chroma D-A/low pass filter 94 are utilized. The analog video signal output from video digitizer 90 is input to frame buffer and separator 96 for storage and separation and to luma D-A/low pass filter 97 and chroma D-A/low pass filter 98. It should be noted, however, that if the video signal input to video digitizer 88 is to only be phase delayed 90 degrees when input to buffer and separator 92, then the later occurring video signal, which was read 180 degrees out of phase from the video signal to be delayed, may not require the storage or delay function of buffer and separator 96.

As previously discussed, the required conversion of analog video and audio signals to digital, for delay purposes, also provides an opportunity to further enhance the signals. If only one signal is to be delayed by 90 degrees in phase, such as the one video signal input to frame buffer and separator 92 of FIG. 6 described above, it is not necessary to do anything to the next occurring video signal input to buffer and separator 96. However, as long as one signal is being delayed, both signals may be delayed and manipulated in some fashion so as to improve the quality of the recorded signal. Although the preferred embodiment described in FIGS. 1–6 provide for delay, storage, and manipulation of both stereo audio signals and separated video signal, even greater manipulation is possible. Accordingly, FIG. 7 is a block diagram further illustrating a different combination of components which may be utilized in place of timing system 60 and write system 100.

Figure 7:
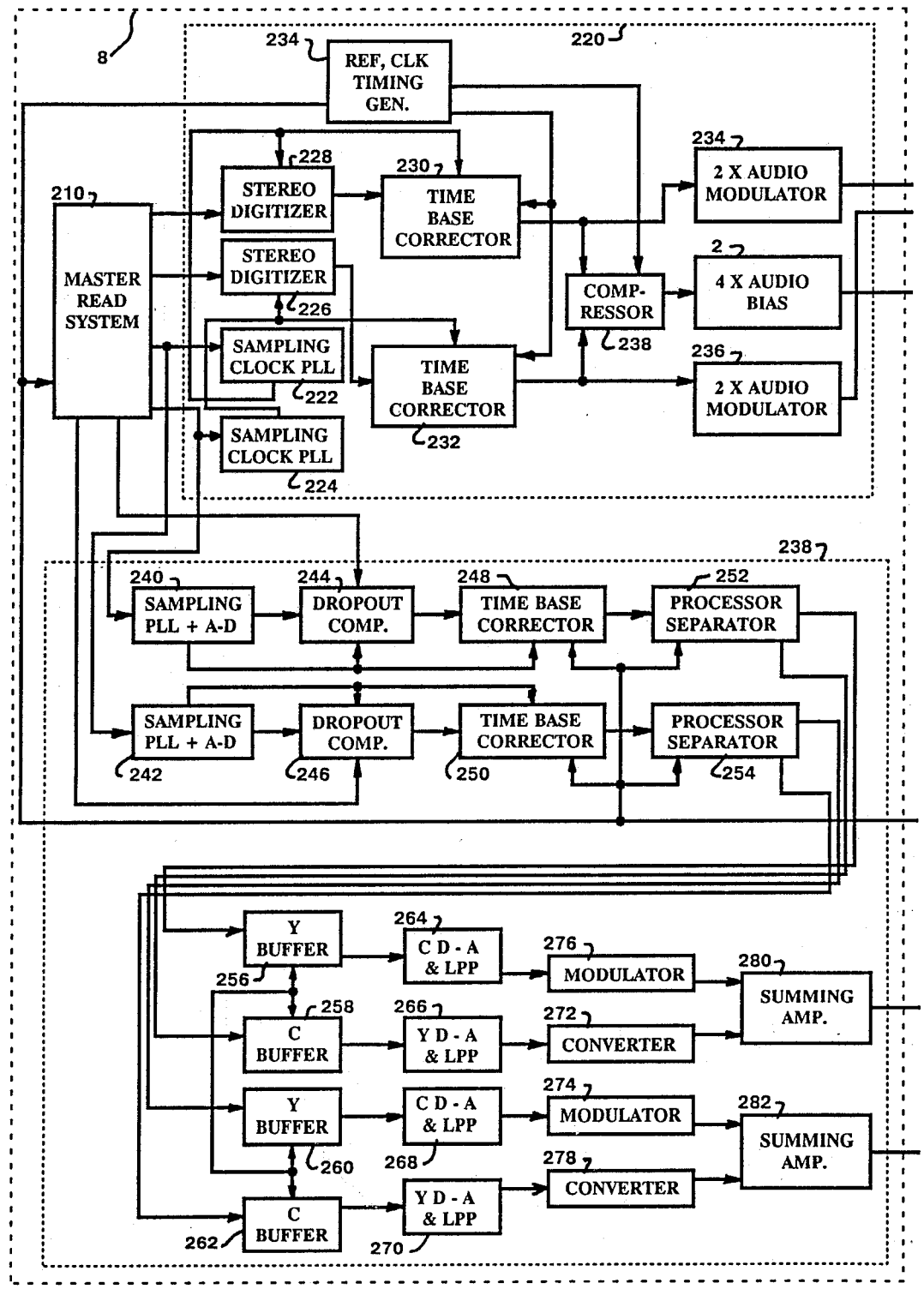
FIG. 7 is a block diagram illustrating an alternative embodiment of the timing system and write system of the master of the present invention.

In FIG. 7, master read system 210, which is substantially the same as previously described read system 10, is combined with an alternative embodiment of the timing system and write system of the present invention. Audio signal compressor 71 of FIG. 4 and FIG. 6 is combined with audio write signal processor 112 to form audio manipulator 220. Audio manipulator 220 once again uses video signals output from master read system 210 to supply timing information to sampling clock PLL's 222 and 224, which are in turn used for timing the analog to digital signal conversion of stereo digitizers 226 and 228 and time base correctors 230 and 232. Reference clock and timing generator 234 provides synchronization to various components throughout the system, as did sync generator 62. It should be noted that time base correction requires signal processing approximately equivalent to buffering and delaying the audio signals, thus additional buffers, as previously depicted being used by time base corrector and buffers 76 and 77, are not necessarily required.

The two output audio signals from time base correctors 230 and 232 may actually be high fidelity audio signals (Hi Fi) having both separate left and right channels. The Hi Fi signals are input to 2X audio modulators 234 and 236, each including two modulators if stereo is desired, and may alternatively be assembled by compressor 238 to form a longitudinal signal operating at four times normal speed if mono if desired. The four-times signal is applied to the audio bias circuit of 4X audio bias 239, where it is combined with a bias signal, before output to stationary write head 150. The operation of audio modulators 234 and 236 is the same as the operation of audio modulators in any standard recording systems, except modulators 234 and 236 each operate at twice the standard carrier frequency.

The video signals used for timing information in audio manipulator 220 are also input to sampling PLL and A-D converters 240 and 242, of video manipulator 238. Video manipulator 238 combines previously described features of delay and output timing system 80, 2X video signal buffer and separator 86, and video write system 120, plus a number of signal enhancement components not included in the previously described recording system. For instance, the output signal of dropout detector 49 may be input to dropout compensators 244 and 246 to correct for dropout in the video signals output from components 240 and 242.

The dropout compensated video signals are then input to time base correctors 248 and 250. These corrected video signals are then input to processor/separators 252 and 254 for standardized chroma processing and chroma and luma separation. Although FIG. 7 depicts separation of the video signal occurring prior to the frame buffering of the video data, and FIG. 6 depicts the separation coming after or at the same time as the frame buffering, either of the two described separation orders are allowable.

In FIG. 7, the separated chroma (C) and luma (Y) signals are stored in buffers 256-262, as is necessary, and then read out to digital-to-analog converter and low pass filter circuits 264-270. The filtered analog luma signals are frequency modulated by luma modulators 272 and 274, while the phase shifted chroma signals are down converted by chroma converters 276 and 278. The frequency modulated and converted signals are then input to summing amplifier 280 and 282, where the separated signals are recombined and amplified for output to the video heads 144.

More than one optical disc read system may be used in combination with the above described system, so that as soon as the first optical disc read system reaches the last track of data on its disc, the next system can begin reading data stored on its disc. When read system are switched, write-systems may be switched as well, or two or more programs may be recorded on the same tape. Thus, the application of the present invention may be extended to digital data recording, digital audio tape, analog audio tape, high definition television image recording, and high speed image, voice and data storage subsystem, such as may be used in medical applications.

FIGS. 1-7 depict a single slave recording system where one master is connected to a single slave recorder. While the recording system can be operated with a single slave connected to the master, the greatest advantage to the reduced component slave recorder 140 is that the parts reduction lowers the production cost of each slave recorder, so it is economical to use more slave recorders. Thus, a recording system using a plurality of reduced component slave recorders could be acquired for much less money than could a standard recording system using an equal number of consumer VTRs, and because of the increased recording speeds, there could be an increase in production by four times or more. Although operators or automatic tape changers would still be required, tapes could be changed four times more often thereby greatly reducing the inefficient waiting time of operators.

A multiple slave recorder recording system is depicted in FIG. 8. The single slave recorder 140 is electronically linked with slave recorder 340, which contains the same small quantity of components as slave recorder 140, such as motors control 360. Slave recorder 340 is entitled "Slave N", where N is a positive whole number, and is separated from slave recorder 140 by an ellipsis to indicate that a plurality of slave recorders omitted from the figure may be connected to master recorder 8.

Figure 9:
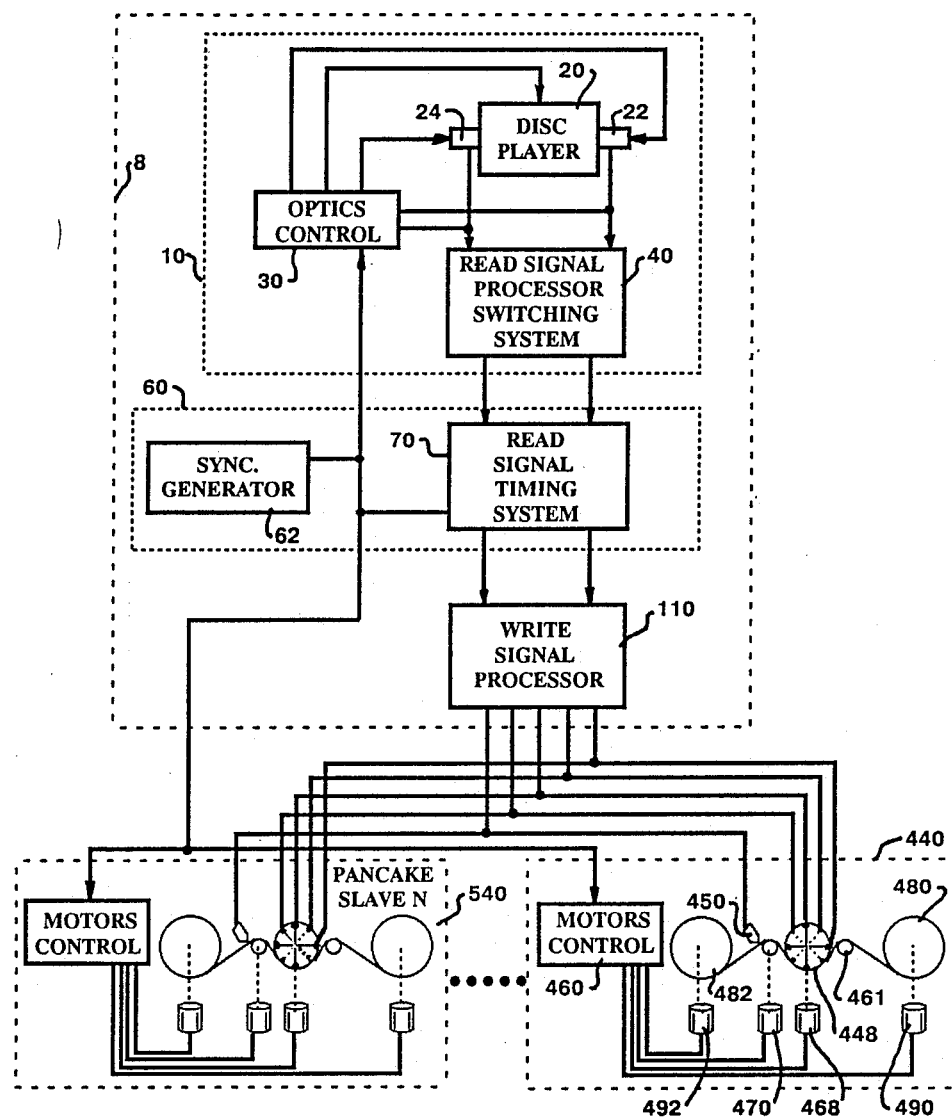
FIG. 9 is a diagram schematically illustrating another alternative embodiment in which a recorder and multiple quantity of pancake slave recorders operate as a recording system.

Another advantage to the reduced component slave recorder and increased recording speed of the present invention is that pancake video tape recording is made feasible. Pancake, or reel-to-reel, mass production duplicating has not been popularly used in the video tape reproduction industry because standard consumer pancake recorders were much more expensive than consumer VTRs, video tape had to first be recorded and then loaded into a cassette rather than vice-versa for VTRs, and recording speeds were too slow to make using pancake recorders advantages. However, by reducing the amount of components required for operation of the pancake recorder, the purchase price can be greatly reduced, and by increasing the recording speed by four times or more, the practicality of using pancake recorders can be enhanced. Therefore, FIG. 9 depicts another alternative embodiment in which a master 8 is connected to a plurality of pancake slave recorders.

Pancake slave recorder 440 is substantially similar to the reduced component cassette slave recorder 140. Head drum 448 has four video and four audio write heads connected in pairs as does head drum 148. Likewise, single stationary audio head 450, motors control 460 capstan 161, head drum motor 468 and capstan motor 470 are all substantially the same as their cassette slave recorder counterparts. The only significant distinction between cassette slave recorder 140 and pancake recorder 440 involves the addition of supply reel 480 and take-up reel 482, the corresponding motors 490 and 492, and the additional motor controls that would be added to motors control 460. Once again, pancake slave recorder 540 is entitled "Pancake Slave N" and separated from pancake slave recorder 440 by an ellipsis to indicate that a plurality of pancake slave recorders can be connected to master 8.

Note that if the signal connecting lines between the master 8 and any of the slave recorders are too long, line drivers may be required to be added to the output lines of the master's write signal processor and line receivers added to the input lines of the slave recorders to prevent signal degradation.

Figure 10:
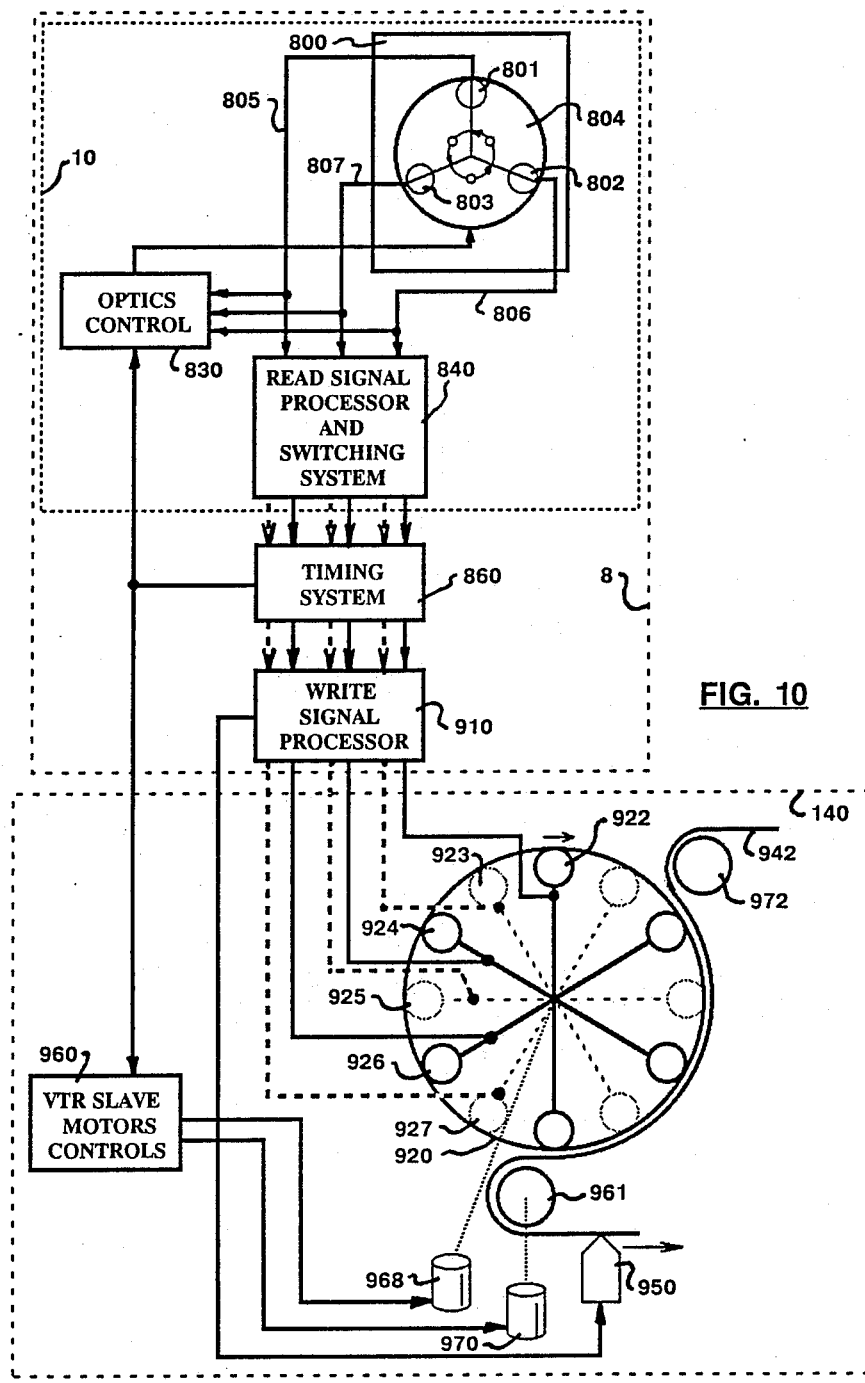
FIG. 10 is a diagram schematically illustrating a further alternative embodiment of the present invention in which at least three read and write head pairs are utilized.

A further alternative embodiment of the present invention is illustrated in FIG. 10. Disc player 800 is configured with three optical read heads 801, 802 and 803 disposed around optical disc 804 and separated by common angles (a), (b), and (c) depicting the angular relationship between the three read heads. Ideally, (a) would typically equal (b) and (c), such that there would be an 120 degree phase separation between the three heads. However, as previously discussed, the phase separation between the read heads may be any angle desired, such as (a) equal to 45 degrees, (b) equal to 45 degress and (c) equal to 90 degrees, provided that any phase separation is corrected by the timing system prior to application of the signals read from disc 804 to the write heads.

Understandably, there may be as many read heads disposed around the optical disc 804 as will physically fit. For each read head, there must be a corresponding output line, such as 805, 806 and 807, which correspond to read heads 801, 802 and 803 respectively. When only two read heads are disposed around the optical disc as shown in FIG. 1, one head reads tracks 1, 3, 5, 7, etc., and the other head reads tracks 2, 4, 6, 8, etc. When three or more read heads are disposed around the optical disc 804, a similar read out pattern is associated with each head and corresponding output line. If N read heads were disposed around optical disc 804, the first read head would read tracks 1, N+1, 2N+1, 3N+1, etc., and the Nth read head would read tracks N, 2N, 3N, 4N, etc. Thus, read head 801 would read tracks 1, 4, 7, 10, etc., read head 802 would read tracks 2, 5, 8, 11, etc., and read head 803 would read tracks 3, 6, 9, 12, etc. Optics control 830 receives outputs 805, 806 and 807, or as many outputs as there may be, and in turn, controls the positioning of the read heads corresponding thereto.

In the two-read head system of FIG. 1, the outputs of read heads 22 and 24 are received by read signal processor and switching system 40 and switched to odd and even output tracks, or lines, therefrom, which are eventually input to the two pairs of write heads 144. It should be noted, however, that the amount of tracks output from read signal processor and switching system 40 may also be an integer multiple of the amount of read heads, such as there are N read heads, there may be M output tracks, where M is a positive integer multiple of N. FIG. 10 illustrates that the three read head output tracks received by read signal processor and switching system 840 may be switched and output therefrom as six separate tracks. The only limitation on the number of tracks output by read signal processor and switching system 840 is the amount of write head pairs which can be disposed on the head drum. Timing system 860 and write signal processor 910 assure that the signals to be recorded by the write heads are simultaneously applied to the various write head pairs. Two output tracks supplying different signals can not be coupled to the same write head. Thus, one pair of write heads must be provided for each track output by write signal processor 910.

The two-read/two-write head pair system of FIG. 1 is simply implemented because only two tracks input signals to the read signal processor and switching system 40, and these two tracks can be switched to two tracks, each of which only carry one of the two video fields, such as field I. However, if one of the tracks input to head drum 920 of FIG. 10 only carried one type of video field, the program to be recorded would not be recorded in the correct order. If write head pair 922 records F1fI, write head pair 924 should record F1fII, write head pair 926 should record F2fI, which would leave head pair 922 to record F2fII. Hence, a different switching order is required when three or more head heads are utilized; a switching order which is even more complicated when the number of write heads are multiplied, such as by adding write head pairs 923, 925 and 927 (represented by dashed lines in FIG. 8) to head drum 920.

To determine the order in which the various fields of the various frames should be switched to the tracks output by read signal processor and switching system 840, it is necessary to assign numerals to each field of each frame, such as numbering F1fI as 1, F1fII as 2, F2fI as 3, etc. If there are N read heads and M write head pairs, the frame/field output sequence of the various head pairs can be illustrated as:

Output to 1st write head pair=1, M+1, 2M+1, etc.
Output to 2nd write head pair=2, M+2, 2M+2, etc.
Output to Mth write head pair=M, 2M, 3M, etc.

Thus, the output sequence to write head pair 922 when only write head pairs 922, 924 and 926 are present, should be 1, 4, 7, 10, etc., or F1fI, F2fII, F4fI, F5fII, etc.; and the output sequence to write head pair 926 should be 3, (2)*(3), (3)*(3), (4)*(3), etc., or 3, 6, 9, 12, etc., or F2fI, F3fII, F5fI, F6fII, etc. If write heads pairs 922, 923, 924, 925, 926 and 927 are utilized, the output sequence to write head pair 922 would be 1, 7, 13, 19, etc., and the output sequence to write head pair 927 would be 6, (2)*(6), (3)*(6), (4)*(6), etc., or 6, 12, 18, 24, etc.

To determine the angular separation between the individual write heads on head drum 920, when more than two write heads pairs are utilized, the following formula is utilized:

$$\text{Angular Head Separation} = 360/2M \text{ (degrees)}$$

where M is the number of write heads pairs. Thus, in the case of a three write head pair head drum, each head would be separated by 60 degrees, while in a six write head pair head drum, each head would be separated by 30 degrees.

When recording video tape in a helical scan format, and where a larger number of heads are disposed on the head drum 920, it may be beneficial to record the audio signals on magnetic tape 942 in mono with only stationary audio write head 950, instead of with stereo heads disposed on the head drum 920 as shown in the preferred embodiment. If the recording on magnetic tape 942 is to be of the constant angular velocity (CAV) type, audio write head 950 is not necessarily needed, because the audio signals can be recorded as a subcarrier merged in the video spectrum, as previously described.

VTR slave motors controls 960 control the movement of head drum 920 and capstan 961, through motor 968 and 970 respectively. Only one motorized capstan 961 is needed to pass magnetic tape 942 across head drum 920. It will be appreciated that the angular range during which magnetic tape 942 is kept in contact with head drum 920 can be smaller than 180 degrees when three or more write head pairs are provided because there is less angular distance between each head. Thus, in a three write head pair head drum, as shown by the solid lined heads of FIG. 10, the angular range can be anywhere from 120 degrees to just over 180 degrees, while the angular range for a six write head pair head drum, as shown by the addition of the dashed lined heads of FIG. 10, can be between 150 degrees and just over 180 degrees.

It is anticipated that other embodiments will become apparent to those skilled in the art after having read this disclosure. Accordingly, it is intended that the following claims be interpreted to cover all such alterations alternatives or modifications as fall within the true spirit and scope of the invention.

What is claimed is:

1. A high speed video tape reproduction system for reproducing a plurality of sequentially occurring frames of data representing video information recorded on a master video storage medium, wherein each frame of data includes a first field of information and a second field of information, comprising:

master storage and read-out means including a master video storage medium for storing video information in an NTSC format and for simultaneously reading out in series each odd frame of data to a first output and each even frame of data to a second output;

processor means coupled to the first and second outputs of said master storage and read-out means and operative to develop an odd stream of information including a serial sequence of the first field of information appearing in each frame of data read out from said master storage and read-out means, and an even stream of information including a serial sequence of the second field of information appearing in each frame of data read out from said master storage and read-out means;

a plurality of slave recorder units electronically connected in parallel, each consisting of a rotary head drum having a first and second pair of recording heads orthogonally disposed relative to each other with each pair lying along a diameter of said drum, a tape supply reel and a tape take-up reel for carrying a length of magnetic recording tape to be drawn across said drum, at least one capstan for drawing said tape across said drum, at least one motor for rotating said capstan and said reels, a motor for rotating said drum and a motor control means for controlling the speed of rotation of said capstan and drum;

central control means for synchronizing the operation of said plurality of slave recorder units with the operation of said master storage and read-out means; and means for coupling said odd stream of information to said first pair of heads and said even stream of information to said second pair of heads in timed sequence, such that said first field information of each particular frame is applied to at least one of said first pair of heads, and said second field information of the corresponding frame is subsequently applied to at least one of said second pair of heads.

2. A high speed video tape reproduction system as recited in claim 1 wherein said master video storage medium is an optical storage disc having said frames of data stored thereon in a plurality of concentric data tracks, and wherein said master storage and read-out means includes:

a first optical read head for reading the data stored along said data tracks to said first output;

a second optical read head disposed opposite said first read head for reading the data stored along said data tracks to said second output; and head control means for causing said first read head to read out information from the first field of a first frame of data while the second head is reading out information from the second field of a second frame of data.

3. A high speed video tape reproduction system as recited in claim 2 wherein said head control means includes:

decoder means for receiving said odd and even streams of information from said processing means, for determining which frame of data corresponds to each field of information input by said odd stream of information and which frame of data corresponds to each field of information input by said even stream of information, and for developing a first decoded output signal from said odd stream of information and a second decoded output signal from said even stream of information; and optics control means operative to receive said first and second decoded output signals and said first and second output signals from said master storage and read-out means and develop a first and second head positioning signal respectively therefrom for controlling alignment and position of said first and second optical read heads.

4. A high speed video tape reproduction system as recited in claim 3 wherein said master storage and read-out means further includes:

spindle motor means, including a spindle motor, for rotating said disc and generating a rotation rate feedback signal; and spindle control means synchronized by said central control means for receiving said rotation rate feedback signal and operative to servo regulate the rotation rate of said spindle motor.

5. A high speed video tape reproduction system as recited in claim 1, wherein said odd stream of information is a first analog signal and wherein said processor means includes a read signal processor means for demodulating and filtering said first analog signal.

6. A high speed video tape reproduction system as recited in claim 1, wherein said coupling means includes:

video buffer means for receiving and storing said odd stream of information for a first period; and buffer timing means for regulating the length of said first period whereby said odd stream of information is coupled to said first pair of heads after being delayed by said first period.

7. A high speed video tape reproduction system as recited in claim 6, wherein said odd stream of information is a first analog signal and wherein said video buffer means includes a charge coupled device for storing said first analog signal.

8. A high speed video tape reproduction system as recited in claim 6, wherein said odd stream of information is a first digital signal and wherein said video buffer means includes a digital store device for storing said first digital signal.

9. A high speed video tape reproduction system as recited in claim 8, wherein said coupling means further includes a write signal processor means for electrically enhancing said first digital signal after said first period and before said odd stream of information is coupled to said first pair of heads.

10. A high speed video tape reproduction system as recited in claim 6, wherein said length of magnetic recording tape is wrapped around a peripheral surface of said drum over an angular range which is greater than or equal to 180 degrees but less than 190 degrees.

11. A high speed video tape reproduction system as recited in claim 1, wherein said coupling means includes:
a first video buffer means for receiving and storing said odd stream of information for a first period;
a second video buffer means for receiving and storing said even stream of information for a second period; and
buffer timing means for regulating the length of said first and second periods, such that said odd stream of information is coupled to said first pair of heads and said even stream of information is coupled to said second pair of heads in said timed sequence.

12. A high speed video tape reproduction system as recited in claim 11, wherein said first period is longer than said second period.

13. A high speed video tape reproduction system as recited in claim 11, wherein said first and second periods are equal.

14. A high speed video tape reproduction system as recited in claim 11, wherein said odd stream of information is a first analog signal and said even stream of information is a second analog signal, and wherein said first video buffer means includes a charge couple device for storing said first analog signal and said second video buffer means includes a charge couple device for storing said second analog signal.

15. A high speed video tape reproduction system as recited in claim 11, wherein said odd stream of information is a first digital signal and said even stream of information is a second digital signal, and wherein said first video buffer means includes digital store device for storing said first digital signal said second video buffer means includes a digital store device for storing said second digital signal.

16. A high speed video tape reproduction system as recited in claim 15, wherein said coupling means further includes a write signal processor means for electrically enhancing said first and second digital signals after said first and second periods respectively and before said odd stream of information is coupled to said first pair of heads and said even stream of information is coupled to said second pair of heads.

17. A high speed video tape reproduction system as recited in claim 11, wherein said length of magnetic recording tape is wrapped around a peripheral surface of said drum over an angular range which is greater than or equal to 180 degrees but less than 190 degrees.

18. A high speed video tape reproduction system as recited in claim 1 wherein said plurality of slave recorder units are cassette recorders.

19. A high speed video tape reproduction system as recited in claim 1 wherein said plurality of slave recorder units are pancake recorders.

20. A high speed video tape reproduction system as recited in claim 2 wherein said coupling means includes:
video buffer means for receiving and storing said odd stream information for a first period; and
buffer timing means for regulating the length of said first period.

21. A high speed video tape reproduction system as recited in claim 20 wherein said odd stream information is a first analog signal and said even stream of information is a second analog signal, and wherein said first period is the amount of time necessary to shift the phase relationship between said first and second analog signals to a new phase relationship corresponding to the mechanical phase relationship between said first and second pairs of recording heads.

22. A high speed video tape reproduction system as recited in claim 21 wherein said video buffer means includes a charge coupled device for storing said first analog signal.

23. A high speed video tape reproduction system as recited in claim 20 wherein said odd stream of information is a first digital signal and said even stream of information is a second digital signal, and wherein said first period is the amount of time necessary to shift the phase relationship between said first and second digital signals to a new phase relationship corresponding to the mechanical phase relationship between said first and second pairs of recording heads.

24. A high speed video tape reproduction system as recited in claim 23 wherein said video buffer means includes a digital store device for storing said first digital signal.

25. A high speed video tape reproduction system as recited in claim 24 wherein said coupling means further includes a write signal processor means for electrically enhancing said first digital signal prior to coupling said first digital signal to said first pair of heads.

26. A high speed video tape reproduction system as recited in claim 2, wherein said coupling means includes:
a first video buffer means for receiving and storing said even stream of information for a first period;
a second video buffer means for receiving and storing said odd stream of information for a second period; and
buffer timing means for regulating the length of said first and second periods, whereby said first period is longer than said second period when the angular spaced relationship between said first and second read heads is greater than 90 degrees but less than 360 degrees, and said second period is longer than said first period when the angular spaced relationship between said first and second read heads is less than 90 degrees but greater than 0 degrees.

27. A high speed video tape reproduction system as recited in claim 26 wherein said odd stream of information is a first analog signal and said even stream of information is a second analog signal, and wherein the time differential between said first and second period is the amount of time necessary to shift the phase relationship between said first and second analog signals to a new phase relationship corresponding to the mechanical phase relationship between said first and second pairs of recording heads.

28. A high speed video tape reproduction system as recited in claim 27 wherein said video buffer means includes a charge coupled device for storing said first and second analog signals.

29. A high speed video tape reproduction system as recited in claim 26 wherein said odd stream of information is a first digital signal, and wherein said even stream of information is a second digital signal and the time differential between said first and second periods is the amount of time necessary to shift the phase relationship between said first and second digital signals to a new phase relationship corresponding to the mechanical phase relationship between said first and second pairs of recording heads.

30. A high speed video tape reproduction system as recited in claim 29 wherein said video buffer means includes a digital store device for storing said first and second digital signals.

31. A high speed video tape reproduction system as recited in claim 30 wherein said coupling means further includes a write signal processor means for electrically enhancing said first and second digital signals prior to respectively coupling said first and second digital signals to said first and second pairs of heads.

32. A method for accomplishing high speed reproduction of a plurality of sequentially occurring frames of data representing video and audio information recorded on a master video storage medium, wherein each frame of data includes a first field of information and a second field of information, comprising the steps of:
   simultaneously reading out in series each odd frame of data from said storage medium to a first output, and each even frame of data from said storage medium to a second output;
   developing an odd stream of information from said first and second outputs including a serial sequence of the first field of information appearing in each frame of data read out from said storage medium, and an even stream of information from said first and second outputs including a serial sequence of the second field of information appearing in each frame of data read out from said storage medium;
   connecting a plurality of slave recorder units in parallel to simultaneously receive synchronizing signals and to record video and audio information, each said slave recorder unit consisting of a rotary head drum having first and second pairs of recording heads orthogonally diposed relative to each other with each pair lying along a diameter of said drum, a tape supply reel and a tape take-up reel for carrying a length of magnetic recording tape to be drawn across said drum, at least one capstan for drawing said tape across said drum, at least one motor for rotating said capstan and said reels, a motor for rotating said drum, and a motor control means for controlling the speed of rotation of said capstan and drum;
   synchronizing the operation of each said slave recorder unit of the plurality of slave recorder units; and
   simultaneously coupling said odd stream of information to the first pair of recording heads of each said slave recorder unit, and simultaneously coupling said even stream of information to second pair of recording heads of each said slave recorder unit in timed sequence, such that each said slave recorder unit records said first field information of each particular frame onto the video tape with one of said first pair of heads and subsequently records said second field information of a corresponding frame onto the video tape with one of said second pair of heads thereby reproducing the original sequence of said plurality of sequentially occurring frames of data stored on said master video storage medium.

33. A method for accomplishing high speed reproduction of a plurality of sequentially occurring frames of data representing video and audio information recorded on a master video storage medium as recited in claim 32, wherein said master video storage medium is an optical storage disc having said frames of data stored thereon in a plurality of concentric data tracks, each said data track commencing with a field sync marker located on a radius of said disc, and wherein said reading step comprises the steps of:
   rotating said disc at a first rotation rate;
   positioning a first optical read head over a first odd frame of data to be read from said storage disc;
   positioning a second optical read head over a first even frame of data to be read from said disc;
   detecting said field sync marker of said first odd frame of data and reading said odd frame of data from said disc to said first output, and then detecting said field sync marker for said even frame of data and reading said even frame of data from said disc to said second output, and thereafter simultaneously reading out in series each odd frame of data from said disc to a first output and each even frame of data from said disc to a second output; and
   monitoring the positioning of said first and second optical read heads.

34. A method for accomplishing high speed reproduction of a plurality of sequential occurring frames of data representing video and audio information recorded on a master video storage medium as recited in claim 33, wherein said monitoring step includes the steps of:
   inputting said odd and even streams of information into a head frame decoder;
   determining which frame of data corresponds to each field of information input by said odd stream of information and which frame of data corresponds to each field of information input by said even stream of information;
   developing a first decoded output signal from said stream of information and a second decoded output signal from said even stream of information;
   combining said first and second decoded output signals and said first and second outputs; and
   developing head positioning signals for controlling the alignment and position of said first and second optical read heads.

35. A method for accomplishing high speed reproduction of a plurality of sequentially occurring frames of data representing video and audio information recorded on a maser video storage medium as recited in claim 34, wherein said step of rotating said optical storage disc at a first rotation rate includes the step of feedback controlling said first rotation rate.

36. A method for accomplishing high speed reproduction of a plurality of sequentially occurring frames of data representing video and audio information recorded on a master video storage medium as recited in claim 32, wherein said odd stream of information is a first analog signal and said even stream of information is a second analog signal, and wherein said developing step includes the steps of:
   demodulating said first and second analog signals; and
   filtering said first and second analog signals.

37. A method for accomplishing high speed reproduction of a plurality of sequentially occurring frames of data representing video information recorded on a master video storage medium as recited in claim 32, wherein said coupling step comprises the steps of:
   receiving and storing said odd stream of information for a first period prior to coupling said odd stream of information to said first pair of heads; and
   regulating the length of said first period such that said odd stream of information is coupled to said first pair of heads after said first period and said even stream of information is directly coupled to said second pair of heads, thereby creating said timed sequence.

38. A method for accomplishing high speed reproduction of a plurality of sequentially occurring frames of data representing video and audio information recorded on a maser video storage medium as recited in claim 37, wherein said odd stream of information is a first analog signal and wherein said step of storing said odd stream of information includes storing said first analog signal for said first period.

39. A method for accomplishing high speed reproduction of a plurality of sequentially occurring frames of data representing video and audio information recorded on a master video storage medium as recited in claim 37, wherein said step of storing said odd stream of information further includes the steps of:
digitizing said odd stream of information into a first digital signal;
storing said first digital signal for said first period; and
converting said first digital signal to a first analog signal prior to coupling said first analog signal to said first pair of heads.

40. A method for accomplishing high speed reproduction of a plurality of sequentially occurring frames of data representing video and audio information recorded on a master video storage medium as recited in claim 39, wherein said coupling step further includes the step of electrically enhancing said first digital signal prior to converting said first digital signal to said first analog signal.

41. A method for accomplishing high speed reproduction of a plurality of sequentially occurring frames of data representing video and audio information recorded on a master video storage medium as recited in claim 32, wherein said coupling step comprises the steps of:
receiving and storing said odd stream of information for a first period prior to coupling said odd stream of information to said first pair of heads;
receiving and storing said even stream of information for a second period prior to coupling said even stream of information to said second pair of heads; and
regulating the length of said first and second periods, whereby said odd stream of information is coupled to said first pair or heads and said even stream of information is coupled to said second pair of heads in said timed sequence.

42. A method for accomplishing high speed reproduction of a plurality of sequentially occurring frames of data representing video and audio information recorded on a master video storage medium as recited in claim 41, wherein said first period is longer than said second period.

43. A method for accomplishing high speed reproduction of a plurality of sequentially occurring frames of data representing video and audio information recorded on a master video storage medium as recited in claim 41, wherein said first period is equal to said second period.

44. A method for accomplishing high speed reproduction of a plurality of sequentially occurring frames of data representing video and audio information recorded on a master video storage medium as recited in claim 41, wherein said odd stream of information is a first analog signal and said even stream of information is a second analog signal, and wherein said steps of storing said odd and even streams of information includes storing said first and second analog signals for said first and second periods respectively.

45. A method for accomplishing high speed reproduction of a plurality of sequentially occurring frames of data representing video and audio information recorded on a master video storage medium as recited in claim 41, wherein said coupling means further comprises the steps of:
digitizing said odd and even streams of information into a first digital signal and a second digital signal, respectively;
storing said first digital signal for said first period;
storing said second digital signal for said second period; and
converting said first digital signal to a first analog signal prior to coupling said first analog signal to said first pair of heads and converting said second digital signal to a second analog signal prior to coupling said second analog signal to said second pair of heads.

46. A method for accomplishing high speed reproduction of a plurality of sequentially occurring frames of data representing video and audio information recorded on a master video storage medium as recited in claim 45, wherein said coupling step further includes the step of electrically enhancing said first and second digital signals prior to converting said first digital signal to said first analog signal and converting said second digital signal to said second analog signal.

47. A method for accomplishing high speed reproduction of a plurality of sequentially occurring frames of data representing video and audio information recorded on a master video storage medium as recited in claim 32, wherein said coupling step includes the step of wrapping said magnetic tape around a peripheral surface of said rotary recording head means over an angular range which is greater than or equal to 180 degrees but less than 360 degrees.

48. A method for accomplishing high speed reproduction of a plurality of sequentially occurring frames of data representing video and audio information recorded on a master video storage medium as recited in claim 32, wherein said odd stream of information is a first digital signal and wherein said even stream of information is a second digital signal, and wherein said coupling step comprises the steps of:
receiving and storing said first digital signal for a first period prior to coupling said first digital signal to said first pair of heads; and
regulating the length of said first period, such that said first digital signal is coupled to said first pair of heads after said first period and said second digital signal is directly coupled to said second pair of heads, thereby creating said timed sequence.

49. A method for accomplishing high speed reproduction of a plurality of sequentially occurring frames of data representing video and audio information recorded on a master video storage medium as recited in claim 32, wherein said odd stream of information is a first digital signal and wherein said even stream of information is a second digital signal, and wherein said coupling step comprises the steps of:
receiving and storing said first digital signal for a first period prior to coupling said first digital signal to said first pair of heads;
receiving and storing said second digital signal for a second period prior to coupling said second digital signal to said second pair of heads; and regulating the length of said first and second periods, whereby said first digital signal is coupled to said first pair of heads and said second digital signal is coupled to said second pair of heads in said timed sequence.

50. A magnetic tape reproduction system for reproducing a plurality of sequentially occurring blocks of data representing information recorded on a master storage medium, wherein each block of data includes a first portion of information and a second portion of information, comprising:

master storage and read-out means including a master storage medium for storing the information in either a constant angular velocity or a constant linear velocity format and for simultaneously reading out in series said blocks of data to N outputs, where N is a positive integer;

processor means coupled to said N outputs of said master storage and read-out means and operative to develop M streams of information, where M is a positive integer multiple of N, including a serial sequence of said first and second portions of information read out from said master storage and read-out means;

a plurality of slave recorder units electronically connected in parallel, each consisting of a rotory head drum having M pairs of recording heads angularly disposed relative to each other with adjacent heads separated by an angle equal to 360/2M degrees with each head of each pair lying along a diameter of said drum, a tape supply reel and a tape take-up reel for carrying a length of magnetic recording tape to be drawn across said drum, at least one capstan for drawing said tape across said drum, at least one motor for rotating said capstan and said reels, a motor for rotating said drum, and a motor control means for controlling the speed of rotation of said capstan and drum;

central control means for synchronizing the operation of said plurality of slave recorder units with the operation of said master storage and read-out means; and means for coupling said M streams of information to said M pairs of recording heads in timed sequence, such that each said first and second portion of information for each said block of data is recorded on said magnetic recording tape in the same sequence in which said portions of information were recorded on said master storage medium.

51. A magnetic tape reproduction system as recited in claim 50, wherein said master storage medium is an optical storage disc having said blocks of data stored thereon in a plurality of concentric data tracks, and wherein said master storage and read-out means includes:

N optical read heads disposed in angularly spaced relationship from each other for reading the data stored along said data tracks to said N outputs; and head control means for causing said read heads to simultaneously read out information from N blocks of data.

52. A magnetic tape reproduction system as recited in claim 51, wherein said portions of information are numbered from 1 through Q, where Q is a positive integer, in the order by which said portions of information where recorded on said master storage medium and said M streams of information are numbered from 1 through M in the order in which said M streams of information receive said first portions of information, and wherein the serial sequence of said first and second portions of information included in each of said M streams of information is determined by the sequence X, M+X, 2M+X, 3M+X, etc., where X is a variable positive integer from 1 through M corresponding to one of said first portions of information, such that the serial sequence of said first and second portions of information transmitted as said Mth stream of information can be represented by the sequence M, 2M, 3M, 4M, . . . Q, when Q represents the last portion of information recorded on said master storage medium and when said Qth portion of information so happens to be transmitted in said Mth stream of information.

53. A magnetic tape reproduction system as recited in claim 52, wherein said length of magnetic recording tape is wrapped around a peripheral surface of said drum over an angular range which is greater than or equal to an angle equal to 180−(360/2M) degrees but less than the greater of 190 degrees or the angle equal to 180−(360/2M) degrees.

* * * * *